United States Patent
Schuessler

(10) Patent No.: US 8,111,403 B2
(45) Date of Patent: Feb. 7, 2012

(54) METHOD AND DEVICE FOR NON-CONTACT OSCILLATION MEASUREMENTS

(75) Inventor: Matthias Schuessler, Waldbronn (DE)

(73) Assignee: Polytec GmbH, Waldbronn (DE)

( * ) Notice: Subject to any disclaimer, the term of this patent is extended or adjusted under 35 U.S.C. 154(b) by 140 days.

(21) Appl. No.: 12/122,879

(22) Filed: May 19, 2008

(65) Prior Publication Data

US 2008/0291466 A1 Nov. 27, 2008

(30) Foreign Application Priority Data

May 21, 2007 (DE) .................. 10 2007 023 826

(51) Int. Cl.
*G01B 11/02* (2006.01)
(52) U.S. Cl. .................................................. 356/502
(58) Field of Classification Search ............... 356/4.09, 356/4.1, 496, 498, 502
See application file for complete search history.

(56) References Cited

U.S. PATENT DOCUMENTS

| | | | |
|---|---|---|---|
| 4,379,633 A * | 4/1983 | Bickel et al. ............... 356/502 |
| 4,621,263 A | 11/1986 | Takenaka et al. |
| 5,260,761 A * | 11/1993 | Barker ............................ 356/4.1 |
| 5,408,305 A | 4/1995 | Webster et al. |
| 6,081,481 A * | 6/2000 | Sabatier et al. ................... 367/8 |
| 6,209,396 B1 | 4/2001 | Wortge et al. |
| 6,633,392 B1 * | 10/2003 | Singh et al. .................... 356/630 |
| 6,907,799 B2 | 6/2005 | Jacobsen et al. |
| 7,242,481 B2 * | 7/2007 | Shpantzer et al. ............. 356/502 |
| 7,463,363 B2 * | 12/2008 | Drake et al. .................... 356/502 |
| 7,535,579 B1 * | 5/2009 | Discenzo ....................... 356/498 |
| 7,583,387 B2 * | 9/2009 | Meldahl et al. ................ 356/498 |
| 7,684,047 B2 * | 3/2010 | Drake et al. .................... 356/502 |
| 2005/0174338 A1 | 8/2005 | Ing et al. |
| 2007/0044581 A1 | 3/2007 | Wilcox et al. |
| 2007/0177154 A1 | 8/2007 | Rembe |
| 2008/0174784 A1 * | 7/2008 | Colonna De Lega et al. ............................ 356/511 |
| 2010/0294917 A1 * | 11/2010 | Morgan et al. ............ 250/214 A |

* cited by examiner

*Primary Examiner* — Gregory J Toatley
*Assistant Examiner* — Scott M Richey
(74) *Attorney, Agent, or Firm* — Volpe And Koenig, P.C.

(57) ABSTRACT

A method and a device for non-contact vibration measurement of an object. Method steps include: Moving at least one laser interferometer, which emits at least one measuring beam to at least one measuring point on the object, detecting the measuring beam reflected by the object, determining the vibration data from the emitted and reflected measuring beam, allocating the vibration data to the measuring point, as well as evaluating the vibration data and displaying the vibration data of the measuring point, with at least one comparison of a position of the laser interferometer being performed using at least one position of a known freely predetermined point on the object and a transformation rule being prepared to determine the position of the laser interferometer in reference to the object for arbitrary measuring positions based on the comparison. The device for measuring vibrations is also disclosed.

14 Claims, 3 Drawing Sheets

METHOD AND DEVICE FOR NON-CONTACT OSCILLATION MEASUREMENTS

CROSS-REFERENCE TO RELATED APPLICATIONS

This application claims the benefit of DE 10 2007023826.8, filed May 21, 2007, which is incorporated herein by reference as if fully set forth.

FIELD OF THE INVENTION

The invention relates to a method for non-contact oscillation or vibration measurements of an object using the following processing steps: determining at least one point of the object to be measured, moving at least one laser interferometer mounted on a carrier into a measuring position to measure the measuring point on the object, emitting at least one measuring beam of the laser interferometer to at least one measuring point on the object, detecting the measuring beam reflected by the object, determining the oscillation data from the emitted and reflected measuring beam, allocating the oscillation data to the measuring point, processing the oscillation data, and displaying the evaluated oscillation data of the measuring point.

The invention also relates to a device for a non-contact detection of oscillations of an object, with the device being particularly suited for the execution of a method having the processing steps according to the invention, comprising at least one laser interferometer having a measuring beam emitter and a detector for the measuring beam reflected by the object, a carrier arranged in a displaceable manner, on which the laser interferometer is fastened, a control unit to control the moveably arranged carrier, as well as a data receiving and evaluating unit to document and process oscillation data, cooperating with the emitter and detector and with the carrier.

BACKGROUND

In prior art it is known to measure oscillations and particularly vibrations of an object by mounting acceleration sensors at certain measuring points on the surface of the object to be measured. Measuring the vibrations then occurs indirectly via these measuring values of the oscillation sensors, with the measurements yielded then being available for display according to location and/or allocation to the respective measuring point.

Frequently, this type of measuring oscillations of an object fails to meet the requirements, because for example an application of acceleration sensors on the surface of an object may distort the oscillation characteristics such that the measurements are unsuitable for evaluation. For example, this is the case when soft surfaces of objects, in which an application of acceleration sensors leads to a deformation of the surface, fundamentally change the oscillation features of the object. In other cases the application of acceleration sensors is possible, however requiring a high expense in the form of labor and time necessary for said application of acceleration sensors, their wiring, as well as the positioning and orientation of the acceleration sensors. The same also applies to the interpretation and evaluation of the measurements yielded from the acceleration sensors.

For quite some time a method has been known to measure oscillations, which allows measurement of the oscillations of an object via optic methods, i.e. a non-contact process. Here, generally one or more laser interferometers and/or so-called laser vibrometers are used, which successively radiate different measuring points on the object using coherent light. If the object is made to vibrate the surface of this object executes an oscillating motion, with the frequency of the light of the laser interferometer reflected by the surface of the object changing due to the Doppler Effect. Based on this change of the frequency deflections as well as acceleration and speed values can be calculated at the respective measuring point of the surface of the object. When the oscillation data of the individual measuring points are combined an oscillation characteristic of the object is yielded.

Such a method and/or such a device are known from EP 1 431 740 A1, for example. In the disclosed method a laser interferometer, on which a program-controlled mobile carrier is mounted, is displaced to each individual point of the object to be measured. The positions of the individual measuring points on the object are here calculated from numeric construction data of the object.

For measurements in various measuring positions, with the term position covering both the respective location and/or the respective orientation, additionally a predetermined fixed distance is maintained. When the measuring position has been reached a measuring beam of the laser interferometer is directed to the point to be measured. Then the oscillation data is collected, correlated to the position data of the measuring points, and displayed and/or evaluated. Subsequently the carrier of the laser interferometer travels to a new measuring position and another measuring point is measured. Successively all measuring points are measured.

It is disadvantageous that here individual measuring points must be approached and measured individually. The measuring process of the entire object is therefore considerably slowed down, because the carrier must be moved into the new measuring position for each measuring process. Here, the same distance to the object must be reached in order to allow any measuring of the oscillation at all. For example, if oscillations of the object shall be measured at high frequencies in order to yield sufficient precision of the oscillation characteristics of the object, a higher number of measuring points are necessary. Due to the fact that in the new measuring position, the same distance from the object must again be maintained a time-consuming control of the respective distance is necessary. Additionally, the mobile carrier and/or the laser interferometer require a wide displacement range to allow keeping the same distance from the measuring points in order to measure all measuring points.

Furthermore, the import of calculated measuring points from the numeric design data of the object are subject to errors, because under real conditions the position of the laser interferometer in reference to the object frequently deviates from the theoretical position and additionally errors of positioning and orientation of the carrier in reference to the object increase, particularly in case of multiple small movements of the carrier and/or the laser interferometer, and the later measuring positions become increasingly imprecise in reference to the object.

In some objects it is also rather difficult to ensure the same fixed distance of the laser interferometer for all measuring points, because objects may be limiting the space to position and align the carrier and/or the laser interferometer, for example by protruding sections of the surface. Sometimes there are measuring points that cannot be measured at all.

SUMMARY

Therefore, the object of the invention is to provide a method and a device, which allow an easier, faster, and more efficient measuring of oscillations or vibrations of an object.

Simultaneously the precision of the oscillation measurement of the object is to be improved.

This object is attained in a method and/or a device having the features according to the invention.

The method according to the invention therefore differs fundamentally from prior art in that at least one alignment of a position of a laser interferometer is performed via at least one point on the object freely predetermined and its position known, and a coordinate transformation instruction to determine the position of the laser interferometer being prepared in reference to the object for arbitrary measuring positions based on the alignment.

The device according to the invention fundamentally differs from prior art in that a device to calculate measuring positions of the laser interferometer is provided, with the calculation of the measuring positions comprising a direct or indirect alignment of the position of at least one known point on the object to the position of the laser interferometer.

By at least one alignment of a position of the laser interferometer using at least the position of a known, freely predetermined point on the object the position of the laser interferometer is determined in reference to the known predetermined point on the object. This alignment allows displaying the position of the laser interferometer in the reference system of the object because the position of the measuring point in the reference system of the object is known.

Due to the fact that the position of the laser interferometer in the reference system of the object is known in reference to the one point, a coordinate transformation instruction is prepared based on the alignment, in order to calculate and allow the display of the position of the laser interferometer in reference to the object even at arbitrary measurement positions in the reference system of the object.

When the orientation of the laser interferometer is known, for example from earlier measurements, it is sufficient if precisely one alignment is performed based on the position of the known predetermined point.

In general, however, at least three known points are necessary to determine the position of the laser interferometer in the reference system of the object, because a total of six degrees of freedom must be determined, i.e. three degrees of freedom for the position and three degrees of freedom for the orientation of the laser interferometer. Then the respective distance between the position of the laser interferometer and the respectively known point and two angles of the orientation of the measuring beam of the laser interferometer are measured for the alignment, with the measuring beam being adjustable with regard to its orientation, for example by a program-controlled angular deflection device of the laser interferometer. This way, the relative position of the laser interferometer can be directly determined in reference to the point known. Additionally, a alignment via the exclusive measuring of angles is possible for the orientation of the measuring beam of the laser interferometer with regard to the respective known point. In order to determine the position of the laser interferometer in the reference system of the object then at least four instead of three points are required.

In order to increase the precision for determining the position of the laser interferometer in the reference system of the object additional known points, for example four to ten known points of the object, can be used having a relatively large distance from each other. The laser interferometer is then displaced into the respective measuring positions to compare the position of the laser interferometer with the position of the respectively known point. The time necessary for a complete oscillation measurement of the object is only marginally increased by the few additional alignments.

In order to determine the position of the laser interferometer in the reference system of the displaceable carrier it is advantageous for at least one additional alignment of a position of the laser interferometer to be performed via at least one position of at least one known, freely determinable point and a coordinate transformation rule being prepared to determine the position of the laser interferometer in reference to the position of the carrier for arbitrary measuring positions based on another alignment. This way, a movement of the laser interferometer into a measuring position is easily possible based on the reference system of the carrier.

For this purpose it is not necessary for at least one known point to be located on the object itself for further alignments, because it may also represent a very precisely measured point at the wall of a measuring chamber, for example. For the further alignment, first the carrier with the laser interferometer is displaced into a measuring position to measure the known point and a measurement is performed. After the alignment has been performed the laser interferometer is displaced along one of the three spatial axes of the carrier, once more realigned to the known point at a new measuring position and another measurement is performed. By moving the carrier into the new measuring position both the distance as well as the angle between the laser interferometer and the known point have changed; the known point has also been shifted in the reference system of the laser interferometer. The vector of this displacement is precisely equivalent to the inverse directional vector of the spatial axis of the carrier along which the laser interferometer has been moved. Therefore, the position of the laser interferometer can now be determined in the reference system of the carrier and a respective coordinate transformation rule can be prepared for the reference system of the laser interferometer and the reference system of the carrier.

After both the relative position of the laser interferometer in the reference system of the object as well as the reference system of the carrier have become known it is possible also to determine the relative position of the carrier in the reference system of the object based on another coordinate transformation rule. If it can be ensured, for example, that in another oscillation measurement of a second object, the object is located at the same position and aligned in the same direction, it is not necessary to determine the mentioned coordinate transformation instructions anew, but they can directly be used for an oscillation measurement of the second object.

Advantageously the movement of the carrier into a measuring position occurs program controlled. This way, another acceleration of the oscillation measurement of the object is achieved because this way automatically the different measuring positions are successively approached and the necessary manual selection of the measuring positions and/or a manual displacement of the carrier and/or the laser interferometer to the individual measuring positions are omitted.

It is beneficial to optimize the number of measuring positions for detecting the object. Due to the fact that different measuring points can be measured from a single measuring position the number of measuring positions can be optimized, for example, such that the support needs to be moved to as few measuring positions as possible; an overall oscillation measurement of the object is therefore accelerated considerably. It is also possible to measure one measurement point of the object from different measuring positions in order to further increase the precision of the oscillation measurement of the object. Here, the number of measuring positions is also selected such that the measuring point can be selected with sufficient precision from a minimum number of measuring positions. Even when only one laser interferometer is used, three-dimensional oscillation measurements are still possible. A measuring point is then measured from at least three different measuring positions of the laser interferometer. The number of measuring positions is then selected such that each measuring point is measured at least three times from different measuring positions. Due to the different one-dimensional oscillation data of the object at said measuring point yielded this way three-dimensional oscillation data can be calculated for this measuring point.

In order to combine different measuring points that can be measured from the measuring position of the laser interferometer under essentially optimal angles it is advantageous when the object to be measured is divided into various segments and particularly the segments are allocated to the respective measuring position.

Furthermore, in order to reduce the time for an oscillation measurement of the object it is beneficial prior to the actual oscillation measurement to perform a preliminary simulation to determine different measurement positions and/or respective measuring points. Here, it is particularly beneficial if the preliminary simulation is performed with the help of a computer-controlled model of the object. An operator can simply and quickly, if necessary manually, perform corrections, for example when selecting measuring positions and/or positions of the laser interferometer. Additionally, by these preliminary simulations measuring points are discovered, which cannot be measured via certain measuring points of the laser interferometer. An operator can then manually select a new measuring position for the measuring point, with this may also occur automatically, for example, using an appropriate computer-controlled program.

When a computer-based model of the object is used it is beneficial when the computer-based model is further improved using evaluated oscillation data such that the model allows a realistic representation of the oscillation behavior of the object. For this purpose, for example, various parameters of the computer-based model, representing the oscillation behavior of the object in a numerical form, can be optimized and/or correlated to the evaluated oscillation data.

In order to increase the precision of the oscillation measurement of an object it is beneficial to recognize faulty measuring points or those not impinged by the measuring beam. Here, it is particularly beneficial if the recognition of faulty measuring points or those not impinged by the measuring beam occurs automatically and thus faster and more reliably.

Beneficially the detection occurs via an image-creating method and/or at least one distance measurement. This allows a simple and effective control of the oscillation measurement. When an image-creating method is used, for example, it is evaluated based on the image of a camera if the measuring beam of the laser interferometer impinges the measuring point of the object with sufficient precision. For this purpose, a measuring beam of the laser interferometer is aligned to a measuring point and it is determined based on the camera image if the measuring point has been impinged by the measuring beam of the laser interferometer within a certain predetermined range. In case of several laser interferometers, it is reviewed based on the respective measuring beam if the measuring point has been impinged. Here, it is recommended to switch off the respective other laser interferometers in order to allow an unambiguous allocation of the respectively emitted and reflected measuring beam to the respectively switched-on laser interferometer.

When using at least one distance measurement, the distance between the position of the measuring point of the object and the position of the laser interferometer is compared to the respectively measured distance. The evaluation of the deviations from the respectively theoretically calculated position, for example based on tolerance bars, then allows a statement to what extent the measuring point has been missed or been impinged incorrectly by the measuring beam of the laser interferometer.

In a device for a contact-free detection of oscillations of an object and particularly suited to perform a method according to the invention a device to calculate measuring positions of the laser interferometer is provided, with the calculation of the measuring position comprising a direct or indirect alignment of the position of a known point on the object to the position of the laser interferometer, in order to perform referencing of the position of the laser interferometer and the known, freely predetermined point on the object and in order to prepare a coordinate transformation rule based on this referencing so that all measuring positions of the laser interferometer can be calculated with great precision.

Advantageously three laser interferometers are arranged in a fixed relative position on the carrier. The arrangement of three laser interferometers allows a three-dimensional oscillation measurement with regard to one measuring point in a simple fashion, because the measuring point can simultaneously be measured from three different spatial directions at a single measuring position. The fixed allocation of the three laser interferometers also allows a simple correlation between the oscillation data yielded from the three laser interferometers, because expensive and time-consuming alignments of different positions of the three laser interferometers in reference to each other are omitted.

In order to allow a number of different measuring points to be measured from various measuring positions it is beneficial to provide means focusing the measuring beam of a laser interferometer. This way, the respective measuring position is therefore largely independent from the position of the respective measuring point and allows a selection of an optimal position of the laser interferometer in reference to the measuring point. A particularly advantageous automatic focusing further shortens the time for an oscillation measuring of a measuring point considerably. Overall, such focusing increases the precision of the oscillation measurement because based on the optimal positioning any noise of the determined oscillation data is minimized.

Beneficially the laser interferometer is provided with at least one angular deflection device and/or a distance meter and/or a device to create and transmit images. This way, not only different measuring points can be measured from a single measuring position of the laser interferometer, but the relative position of the laser interferometer can also be determined or controlled using the distance and/or the image. Additionally, the recognition of measuring points is possible, which are missed by a measuring beam of the laser interferometer or impinged incorrectly. A subsequent, time-consuming control of individual oscillation data obtained erroneously is therefore omitted.

Advantageously the control unit can be programmed. This allows a fully automated oscillation measurement, i.e. a so-called "scanning" of the object and the execution and/or the control of the oscillation measurement by operating personnel is no longer necessary. For example, then a complete oscillation measurement of an object can be performed fully automated over night.

BRIEF DESCRIPTION OF THE DRAWINGS

Additional advantages and features of the invention are discernible from the following description of an exemplary embodiment using the drawings, in which.

DETAILED DESCRIPTION OF THE PREFERRED EMBODIMENTS

Figure 1:
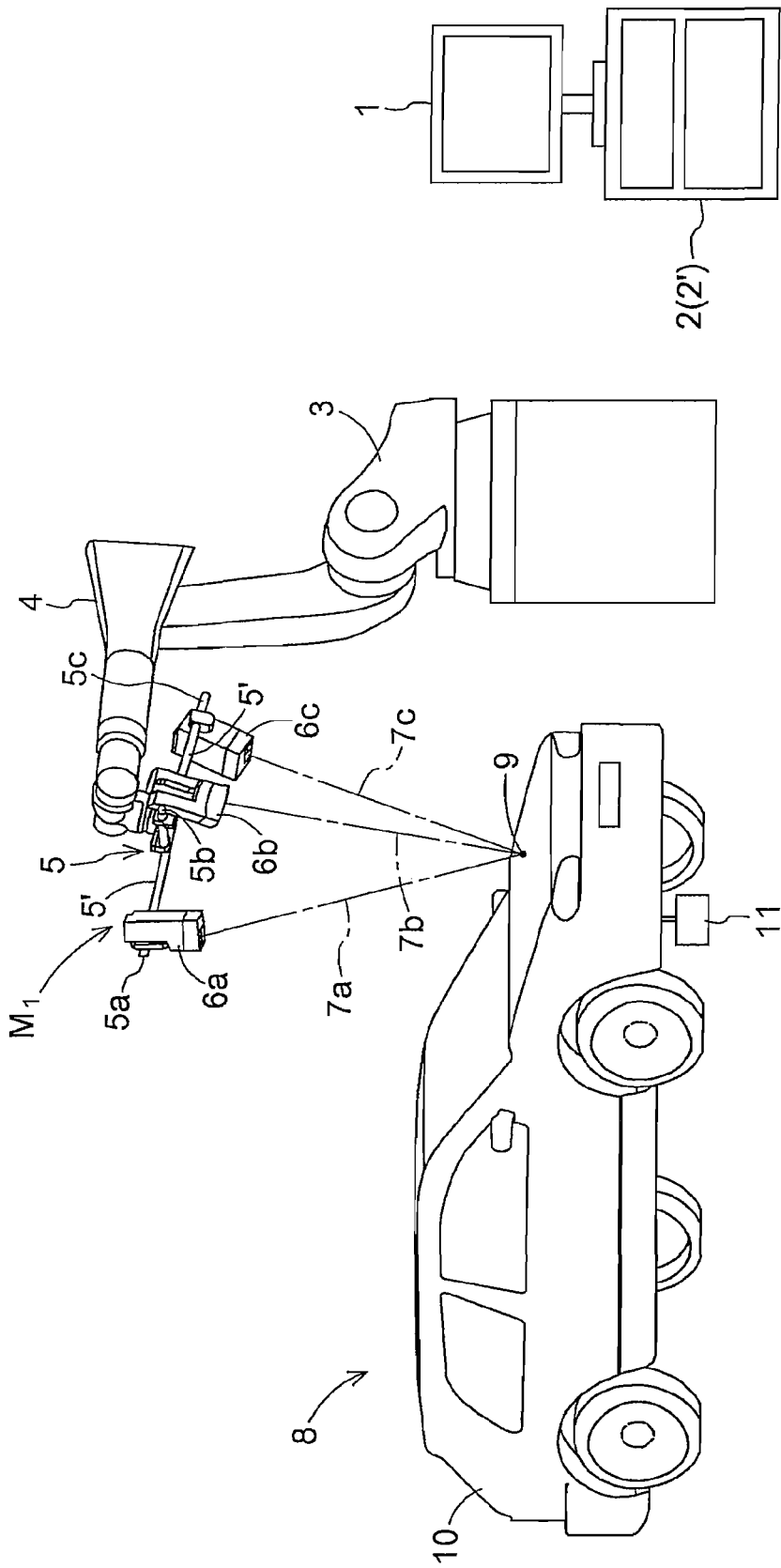
FIG. 1 is a schematic illustration of an exemplary embodiment of a device according to the invention to perform the method according to the invention.

FIG. 1 shows a device according to the invention for a non-contact oscillation or vibration measurement, by which the oscillations of a body 10 of a car 8 shall be measured. For this purpose, three laser interferometers 6a, 6b, 6c are mounted in an end region of legs 5' of a carrier 5. In particular, the legs 5' are here arranged such that the end points 5a, 5b, 5c of the legs 5' combined form the tips of an essentially equilateral triangle; however, different arrangements are also possible within the scope of the invention.

The carrier 5 in turn is fastened to a holding arm 4 of an industrial robot 3 and, via the holding arm 4, the carrier 5 can be moved into different measuring positions $M_1$ to measure oscillations of the body 10. Here, the position of the respective measuring position $M_1$ in reference to a measuring point 9 on the surface of the body 10 can be essentially freely selected and is usually selected such that the measuring point 9 is impinged at an optimal distance and an optimal angle by the measuring beams 7a, 7b, 7c of the three laser interferometers 6a, 6b, 6c.

Due to the fact that the three laser-interferometers 6a, 6b, 6c are arranged on the carrier 5 in a fixed spatial allocation to each other via the legs 5', an expensive determination and alignment of positions of individual laser interferometers 6a, 6b, 6c is omitted prior to each oscillation measurement of a measuring point 9. Then, the position of the laser-interferometer 6a, 6b, 6c must be determined in the reference system of the carrier 5 only once, for example based on another alignment.

Figure 2:
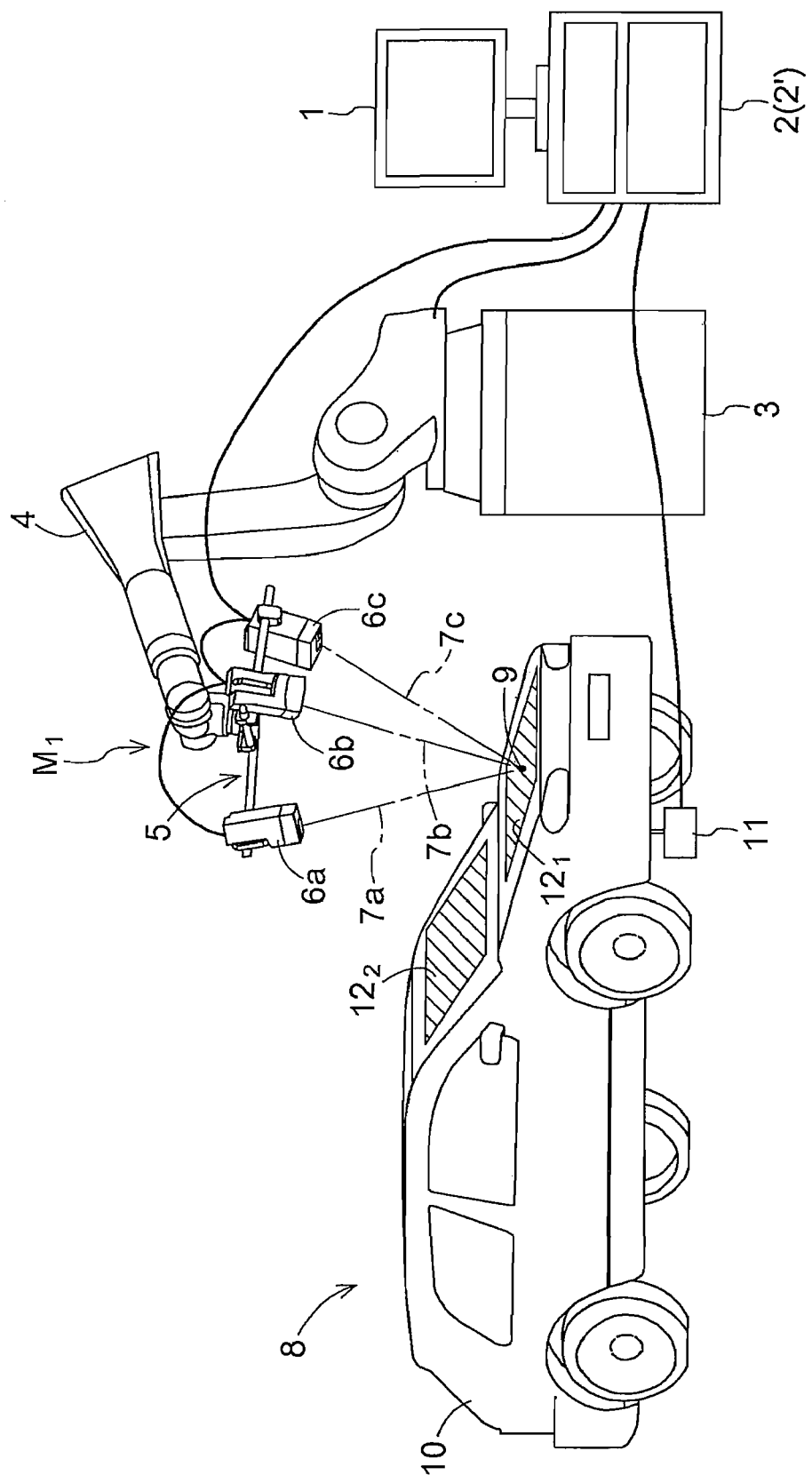
FIG. 2 is an overview showing a measuring position of the laser interferometer of the device according to the invention for measuring the measuring points at various segments of a vehicle.
Figure 3:
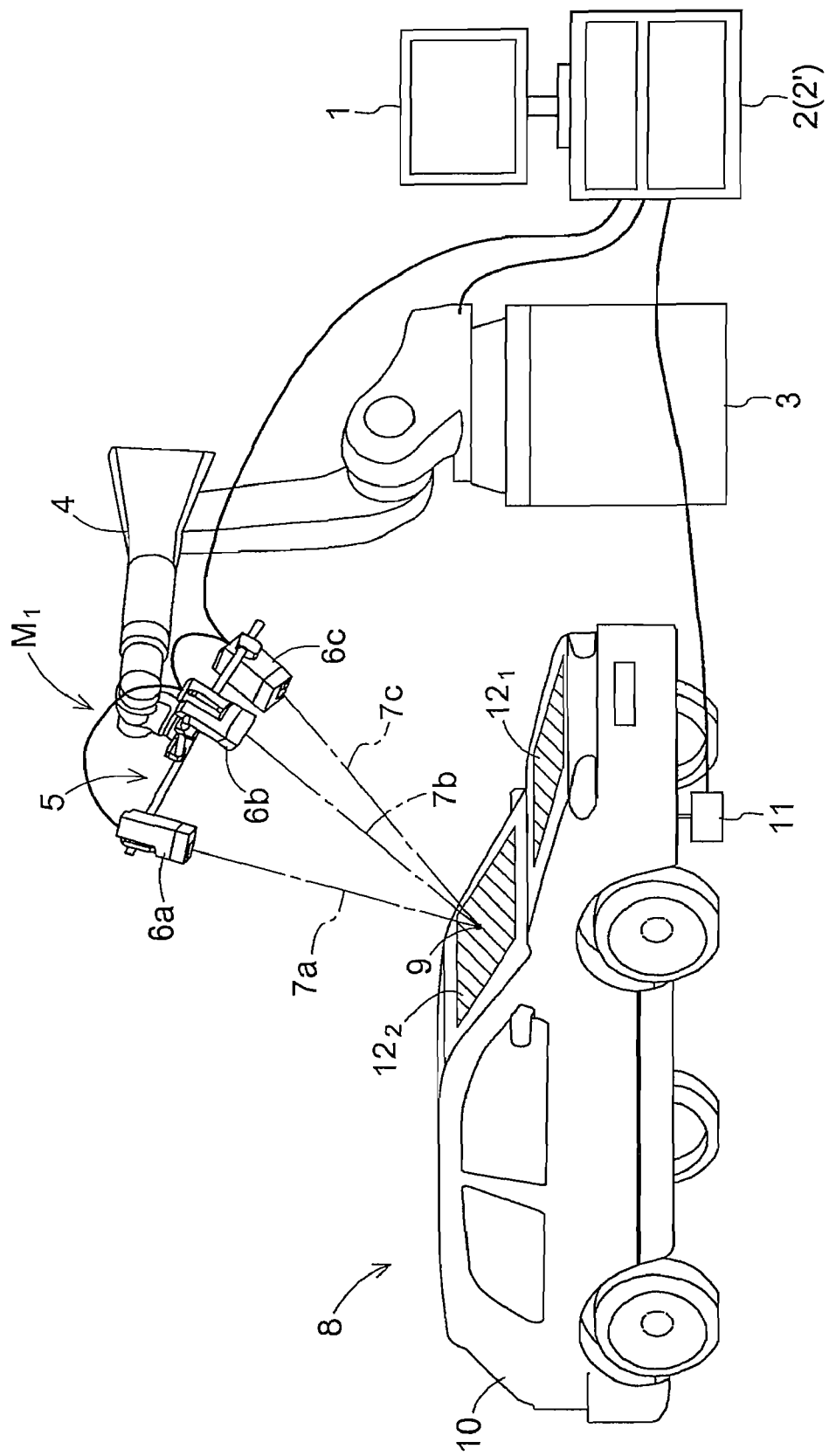
FIG. 3 is a view similar to FIG. 2 showing a measuring position of the laser interferometer of the device according to the invention measuring the measuring point at another various segment of a vehicle.

A control unit 2 to control the holding arm 4 of the industrial robot 3 transmits the spatial coordinates of the measuring points 9 to a data collection and processing unit 2', which is connected to the individual laser interferometers 6a, 6b, 6c (also see FIG. 2 and/or FIG. 3; not shown in FIG. 1). Here, a commercial computer 2, 2' can perform both the tasks of a control unit 2 as well as that of a data collection and processing unit 2'. The collected and/or processed data can then be visualized on a monitor 1 of the computer 2, 2'.

Here, the computer 2, 2' does not serve to collect and process oscillation data. Using a computer-based model of the car 8 to measure oscillations in the run-up of a real oscillation measurement a preliminary simulation of the oscillation measurement of the car 8 occurs. The individual measuring positions $M_1$ are illustrated via the monitor 1 of the computer 2, 2'. Simultaneously the computer 2, 2' calculates potential measuring points 9 on the surface of the body 10 of the car 8 from the respective measuring positions $M_1$. Additionally, the preliminary simulation determines measuring points 9, which cannot be impinged by the measuring beams 7a, 7b, 7c from certain measuring positions $M_1$. If necessary, new measuring positions $M_1$, $M_2$ are determined and set for these measuring points 9, so that these measuring points 9 can also be measured during the process of the actual oscillation measurement.

Furthermore, by the preliminary simulations other parameters of the oscillation measurement are determined and/or extrapolated, for example the duration of a complete oscillation measurement of the car 8. Finally, based on the preliminary simulation different areas of the surface of the body 10 of the car 8 are divided into segments $12_1$, $12_2$ (see FIGS. 2 and 3, shown hatched) with individual measuring points 9 of the segments $12_1$, $12_2$ in turn being measured from a common measuring position $M_1$, $M_2$. Finally, using the computer 2, 2' different measuring positions $M_1$, $M_2$ with allocated measuring points 9 are determined in order to provide program-controlled performance of the oscillation measurement of the car 8 and/or individual segments $12_1$, $12_2$ in an entirely automated fashion.

After the preliminary simulation is finished the real oscillation measurement begins. For this purpose, first at least one laser interferometer 6a, 6b, 6c is moved via the carrier 5 into a measuring position $M_1$ for an indirect alignment by the computer 2, 2' such that a known point on the surface of the body 10 is measured. Based on this alignment the computer 2, 2' prepares a coordinate transformation instruction allowing the determination of the location of the laser interferometer 6a, 6b, 6c at arbitrary measuring positions $M_1$, $M_2$.

After the coordinate transformation instruction has been prepared, the car 8 is incited to oscillate.

For stimulating the car 8 and/or its body 10 into oscillations a so-called shaker 11 is used, which is connected in a form-fitting, actuated, or material-fitting manner, for example by way of adhesion to the body 10 of the car 8. The position of the connection between the shaker 11 and the body 10 of the car 8 is here referenced as so-called force introduction point K. The shaker 11 is further connected to the computer 2, 2' and is controlled and monitored with the help of the computer 2, 2'. Preferably, at least one acceleration sensor, not shown, and one force sensor, not shown, are arranged between the shaker 11 and the force introduction point K, which directly measure the transfer of force to the body 10 of the car 8 as well as the acceleration values at the force introduction point K. These acceleration values and force values are collected by the computer 2, 2'. Using these transmitted acceleration and force values, now a model analysis can be performed in combination with the oscillation data of the laser interferometer 6a, 6b, 6c, yet to be measured, after the conclusion of the oscillation measurement, i.e. particularly a determination of the natural oscillation and natural forms of the car 8. Furthermore, the computer 2, 2' determines, based on the collected acceleration and force values, if the body 10 is incited at all according to the desired excitation frequencies transferred from the shaker 11 to the body 10.

After in the preliminary simulation all measuring positions $M_1$, $M_2$ and the corresponding measuring points 9 have been determined, the computer 2, 2' controls the industrial robot 3 and/or the holding arm 4 such that the laser interferometer 6a, 6b, 6c is moved into the first measuring position $M_1$. The laser interferometers 6a, 6b, 6c transmit and receive measuring beams 7a, 7b, 7c for measuring the oscillation of the measuring point 9 and transmit the oscillation data to the computer 2,2' for processing and display of the oscillation data.

Prior to each oscillation measurement, the measuring beams 7a, 7b, 7c of the respective laser interferometer 6a, 6b, 6c are focused to the respective measuring point 9 with the help of a focusing device, not shown. In order to save time, here a focusing for the measuring point 9 can be waived if a focusing process of the laser interferometer 6a, 6b, 6c previously performed for a measuring point is sufficient for the measuring point 9 as well. This applies, for example, in case the distance between the previous measuring point and the present measuring point 9 is short.

In order to measure the oscillations of the next individual measuring point 9 of the measuring position $M_1$, angular deflection devices, not shown, of the laser interferometer 6a, 6b, 6c are then adjusted such that another measuring point 9 can be measured without changing the measuring position $M_1$. For this purpose, the angular deflection devices are provided with motorized mirrors and/or piezo elements; additionally the angular deflection devices are adjustable, in particular indirectly program controlled via the computer 2, 2'.

When all measuring points 9 of a measuring position $M_1$ and/or a segment $12_1$ have been measured, the computer 2, 2' calculates the next measuring position $M_2$ and accordingly controls the holding arm 4 of the industrial robot 3 such that the carrier 5 and/or the laser interferometer 6a, 6b, 6c arranged thereat reach the new measuring point $M_2$ to measure the oscillations of other measuring points 9.

In principle, the holding arm 4 of an industrial robot 3 may also be programmed for only to an individual measuring position $M_1$, i.e. the holding arm 4 is manually moved into the respective measuring position $M_1$ and measures selected measuring points 9 on the surface of the body 10. When a computer-controlled model of the object is stored in the computer 2, 2' this process can also be performed automatically. An operator can select the different measuring points at the monitor 1.

FIGS. 2 and 3 essentially show two different measuring positions $M_1$, $M_2$ of the holding arm 4 and/or the carrier 5, which are typically determined during the preliminary simulation and/or during an actual oscillation measurement of the car 8. Here, the laser interferometer 6a, 6b, 6c focus measuring beams 7a, 7b, 7c to one measuring point 9 each located on the surface of the body 10 of the car 8. Here, the measuring points 9 measurable from the respective measuring positions $M_1$, $M_2$ are shown combined to a respective segment $12_1$, $12_2$. When all measuring points 9 of the segment $12_1$ have been measured the holding arm 4 and/or indirectly the respective laser interferometer 6a, 6b, 6c is moved into the new measuring position $M_2$ computer-controlled by the computer 2, 2', with then in turn the respective measuring points 9 allocated to the segment $12_2$ being automatically measured according to a freely selected sequence.

When all desired measuring points 9 have been measured the computer 2, 2' can once more conduct program-controlled measuring of missing or faulty measuring points. For this purpose, the carrier 5 is displaced back into the respective measuring positions $M_1$, $M_2$ via the holding arm 4, using the computer 2, 2'. Here, the detection of faulty or missed measuring points 9 can also occur as early as during the first oscillation measurement of the measuring point 9. The computer 2, 2' can calculate the oscillation data of the faulty measured measuring point 9, particularly without a renewed oscillation measurement of falsely measured measuring points 9, for example by an interpolation of the correctly measured measuring points 9.

In general, it is within the scope of the invention includes that for shortening the duration of the oscillation measurement of an object several industrial robots may be provided having one or more holding arms each, with one carrier each being arranged for at least one interferometer at the holding arms.

Furthermore, an incitation of the object to oscillate can also occur according to the invention via different devices than a shaker, particularly in cars oscillation can also incited via a motor installed within the car, by a simulated road, on which the wheels of the car roll, or by loud speakers arranged inside a compartment of the car.

Additionally, it is also within the scope of the invention to prepare the respective coordinate transformation instructions between the reference system of the laser interferometer, the object, and the displaceable carrier based on another reference system independent from the above-mentioned reference systems.

Finally, it is also within the scope of the invention to provide not only a mobile carrier with at least one laser interferometer mounted thereupon to measure a measuring point on an object but it is also possible to provide a displaceable carrier for moving the object itself, in particular program-controlled as well, so that the object for an oscillation measurement can be moved into a measuring position in reference to a laser interferometer. Here, it is also within the scope of the invention to provide a mobile carrier for the laser interferometer as well as for the object, both of which being displaceable in a program-controlled fashion and thus able to reach an optimal position in reference to each other for measuring oscillations.

Summarizing, the invention particularly provides the advantage that a non-contact oscillation measurement of an object is considerably improved with regard to its precision and simultaneously the expense in time and labor is considerably reduced for a comprehensive oscillation measurement of the object.

The invention claimed is:

1. A method for a non-contact vibration measurement of an object comprising the processing steps of:
    determining at least one point (9) of the object (8) to be measured;
    moving at least one laser interferometer (6a, 6b, 6c) mounted on a carrier (5) into a measuring position ($M_1$) to measure the measuring point (9) on the object (8);
    emitting at least one measuring beam (7a, 7b, 7c) of the laser interferometer (6a, 6b, 6c) to at least one measuring point (9) on the object (8);
    detecting the measuring beam (7a, 7b, 7c) reflected by the object (8);
    determining oscillation data from the emitted and reflected measuring beam (7a, 7b, 7c);
    allocating vibration data to the measuring point (9);
    evaluating the vibration data and displaying processed vibration data of the measuring point (9);
    performing at least one alignment of a position of the laser interferometer (6a, 6b, 6c) for at least one position of a known freely-determined point on the object (8), and
    preparing a coordinate transformation instruction to determine a position of the laser interferometer (6a, 6b, 6c) in reference to the object (8) for arbitrary measuring positions ($M_1$, $M_2$) based on the alignment.

2. A method according to claim 1, further comprising
    performing at least one additional alignment of a position of the laser interferometer (6a, 6b, 6c) using at least one position of at least one known, freely determined point, and
    preparing a coordinate transformation rule to determine the position of the laser interferometer (6a, 6b, 6c) in reference to a position of the carrier (5) for arbitrary measuring positions ($M_1$, $M_2$) based on another alignment.

3. A method according to claim 1, wherein movement of the carrier (5) towards a measuring position ($M_1$, $M_2$) is program controlled.

4. A method according to claim 1, wherein an optimization of a number of measuring positions ($M_1$, $M_2$) is performed to determine the object (8).

5. A method according to claim 1, further comprising dividing the object (8) to be measured into different segments ($12_1$, $12_1$, with the segments ($12_1$, $12_2$) being allocated to one measurement position ($M_1$, $M_2$) each.

6. A method according to claim 1, wherein a preliminary simulation to determine different measuring points ($M_1$, $M_2$) or respective measuring points (9) is performed utilizing a computer-based model of the object (8).

7. A method according to claim 6, wherein the computer-based model of the object (8) is improved based on the processed oscillation data.

8. A method according to claim 1, further comprising automatically detecting measuring points (9) that were missed or incorrectly impinged by the measuring beam (7a, 7b, 7c).

9. A method according to claim 8, wherein the detection occurs via an imaging method or at least one distance measurement.

10. A device for a non-contact detection of vibrations of an object, comprising:
at least one laser interferometer (6a, 6b, 6c) having an emitter for a measuring beam (7a, 7b, 7c) and a detector for the measuring beam (7a, 7b, 7c) reflected by the object (8),
a movable carrier (5) on which the laser interferometer (6a, 6b, 6c) is mounted,
a control unit (2) to control the movable carrier (5),
a data processing and evaluation device (2') to register and process vibration data, cooperating with the emitter and detector and with the carrier (5), and a computer device to calculate the measuring positions ($M_1$, $M_2$) of the laser interferometer (6a, 6b, 6c) is provided, with the calculation of the measuring positions ($M_1$, $M_2$) comprise a direct or indirect alignment of the position of a known point on the object (8) to the position of the laser interferometer (6a, 6b, 6c).

11. A device according to claim 10, wherein two additional laser interferometers (6b, 6c) are arranged on the movable carrier (5) in fixed relative positions to one another.

12. A device according to claim 10, further comprising an automatic focusing device for the measuring beam (7a, 7b, 7c).

13. A device according to claim 10, wherein the laser interferometer (6a, 6b, 6c) comprises at least one angular deflection device, a distance meter or an imaging and image transmission device.

14. A device according to claim 10, wherein the control unit (2) is programmable.

* * * * *